United States Patent
Tomizawa et al.

(10) Patent No.: US 6,822,625 B2
(45) Date of Patent: Nov. 23, 2004

(54) IMAGE PROCESSING DEVICE

(75) Inventors: Hidekazu Tomizawa, Tokyo (JP);
Hiroshi Yamashita, Kanagawa (JP);
Nobuo Yamazaki, Chiba (JP)

(73) Assignee: Sony Corporation, Tokyo (JP)

( * ) Notice: Subject to any disclaimer, the term of this patent is extended or adjusted under 35 U.S.C. 154(b) by 281 days.

(21) Appl. No.: 10/168,656

(22) PCT Filed: Oct. 25, 2001

(86) PCT No.: PCT/JP01/09382

§ 371 (c)(1),
(2), (4) Date: Sep. 16, 2002

(87) PCT Pub. No.: WO02/39416

PCT Pub. Date: May 16, 2002

(65) Prior Publication Data

US 2003/0048385 A1 Mar. 13, 2003

(30) Foreign Application Priority Data

Oct. 25, 2000 (JP) .................................... 2000-326153

(51) Int. Cl.$^7$ .............................................. G09G 1/14
(52) U.S. Cl. ...................... 345/20; 345/690; 345/611; 348/470
(58) Field of Search ................................ 345/596–599, 345/611–616, 690, 204, 10, 20; 382/254–260; 348/470

(56) References Cited

U.S. PATENT DOCUMENTS

| | | | | |
|---|---|---|---|---|
| 5,838,463 A | * | 11/1998 | Gahang | 358/465 |
| 5,883,983 A | * | 3/1999 | Lee et al. | 382/268 |
| 6,225,762 B1 | * | 5/2001 | Fujimori et al. | 315/370 |
| 6,348,903 B1 | * | 2/2002 | Wu et al. | 345/10 |
| 6,741,753 B1 | * | 5/2004 | Moroney | 382/274 |
| 6,771,832 B1 | * | 8/2004 | Naito et al. | 382/252 |

* cited by examiner

Primary Examiner—Kent Chang
(74) Attorney, Agent, or Firm—Jay H. Maioli

(57) ABSTRACT

Picture processing apparatus has a pixel judgment circuit and a pixel correction circuit. The pixel judgment circuit includes a target pixel detection circuit for detecting a target pixel having a peak level from the input picture signal, and an edge detection circuit for detecting edges, each present at a distance of n pixels ($n \geq 1$) preceding and succeeding the target pixel. Further, the pixel correction circuit has a correction coefficient selection circuit, wherein a peak level correction coefficient is selected according to an output from the target pixel detection circuit, and an edge correction coefficient is selected according to an edge detection output. With the picture processing apparatus, a level of the target pixel is corrected and an edge of the input picture signal is corrected with the pixels of the input picture signal being corrected according to the peak level correction coefficient and the edge correction coefficient.

6 Claims, 18 Drawing Sheets

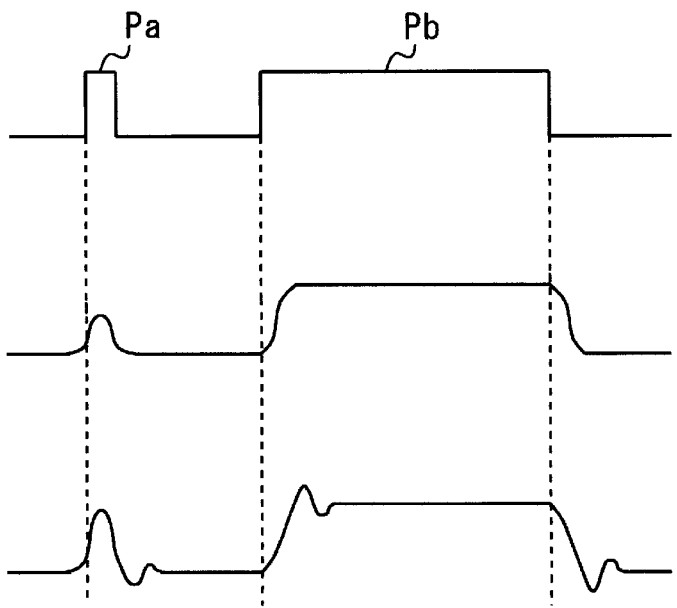
FIG. 2A
IDEAL WAVEFORM
FIG. 2B
WAVEFORM DETERIORATED IN
SIGNAL TRANSMISSION SYSTEM
FIG. 2C
WAVEFORM AFTER PEAKING
PROCESSING
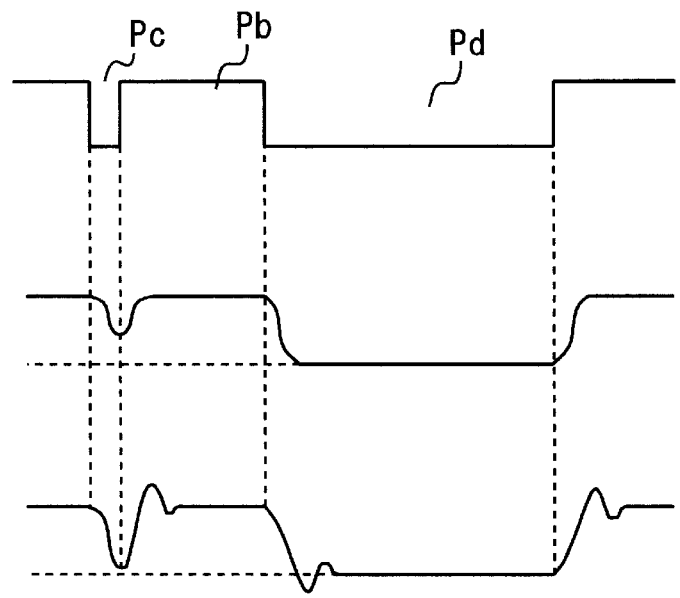
FIG. 3A
IDEAL WAVEFORM
FIG. 3B
WAVEFORM DETERIORATED IN
SIGNAL TRANSMISSION SYSTEM
FIG. 3C
WAVEFORM AFTER PEAKING
PROCESSING FIG. 4
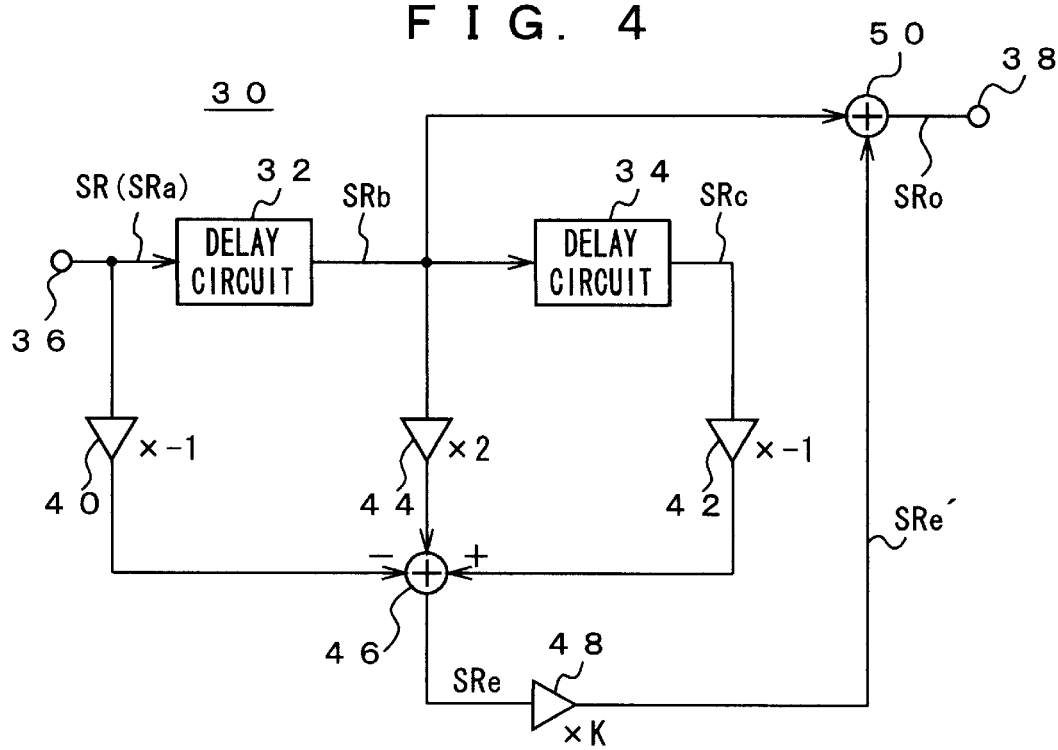
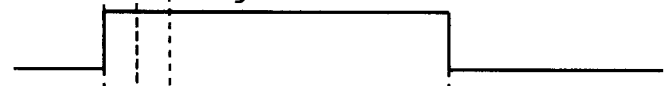
FIG. 5A  SRa WAVEFORM
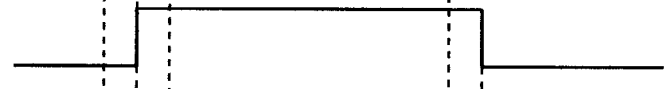
FIG. 5B  SRb WAVEFORM
FIG. 5C  SRc WAVEFORM
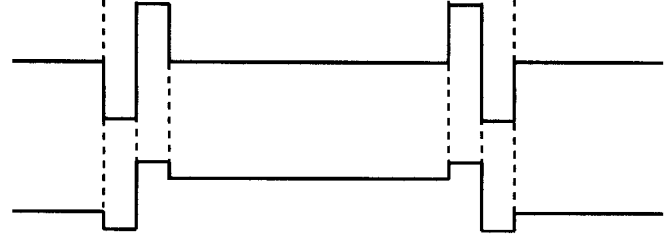
FIG. 5D  SRe WAVEFORM (SRe´)
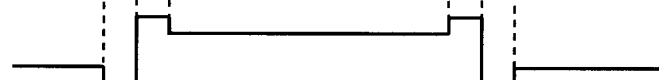
FIG. 5E  SRo WAVEFORM

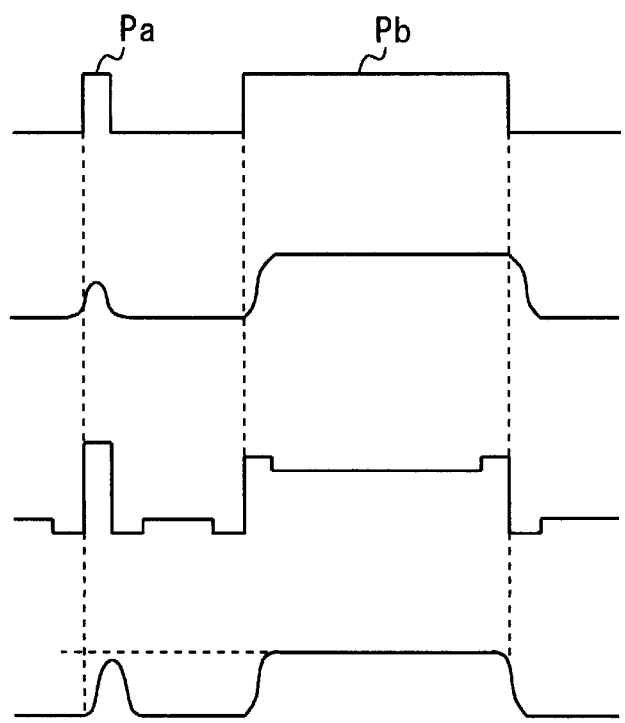

FIG. 6A IDEAL WAVEFORM

FIG. 6B LUMINANCE DISTRIBUTION DETERIORATED BY APERTURE EFFECT

FIG. 6C WAVEFORM AFTER APERTURE CORRECTION

FIG. 6D LUMINANCE DISTRIBUTION IMPROVED BY APERTURE CORRECTION

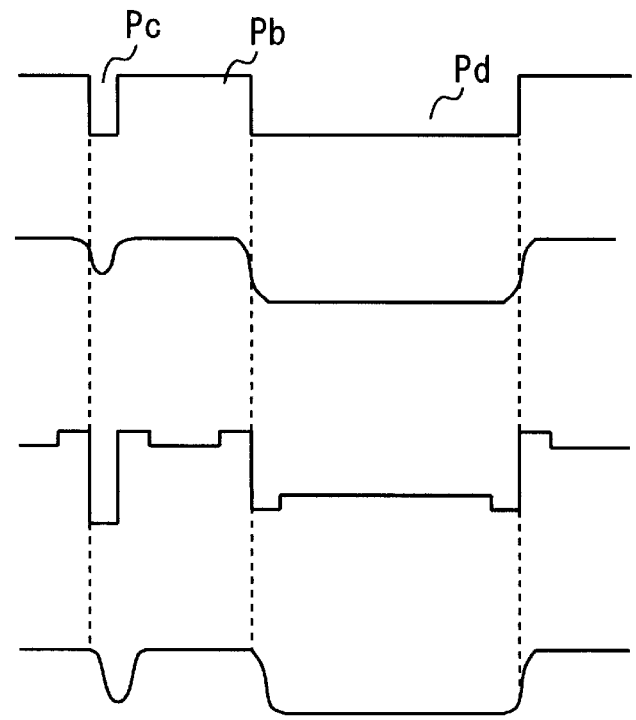

FIG. 7A IDEAL WAVEFORM

FIG. 7B LUMINANCE DISTRIBUTION DETERIORATED BY APERTURE EFFECT

FIG. 7C WAVEFORM AFTER APERTURE CORRECTION

FIG. 7D LUMINANCE DISTRIBUTION IMPROVED BY APERTURE CORRECTION

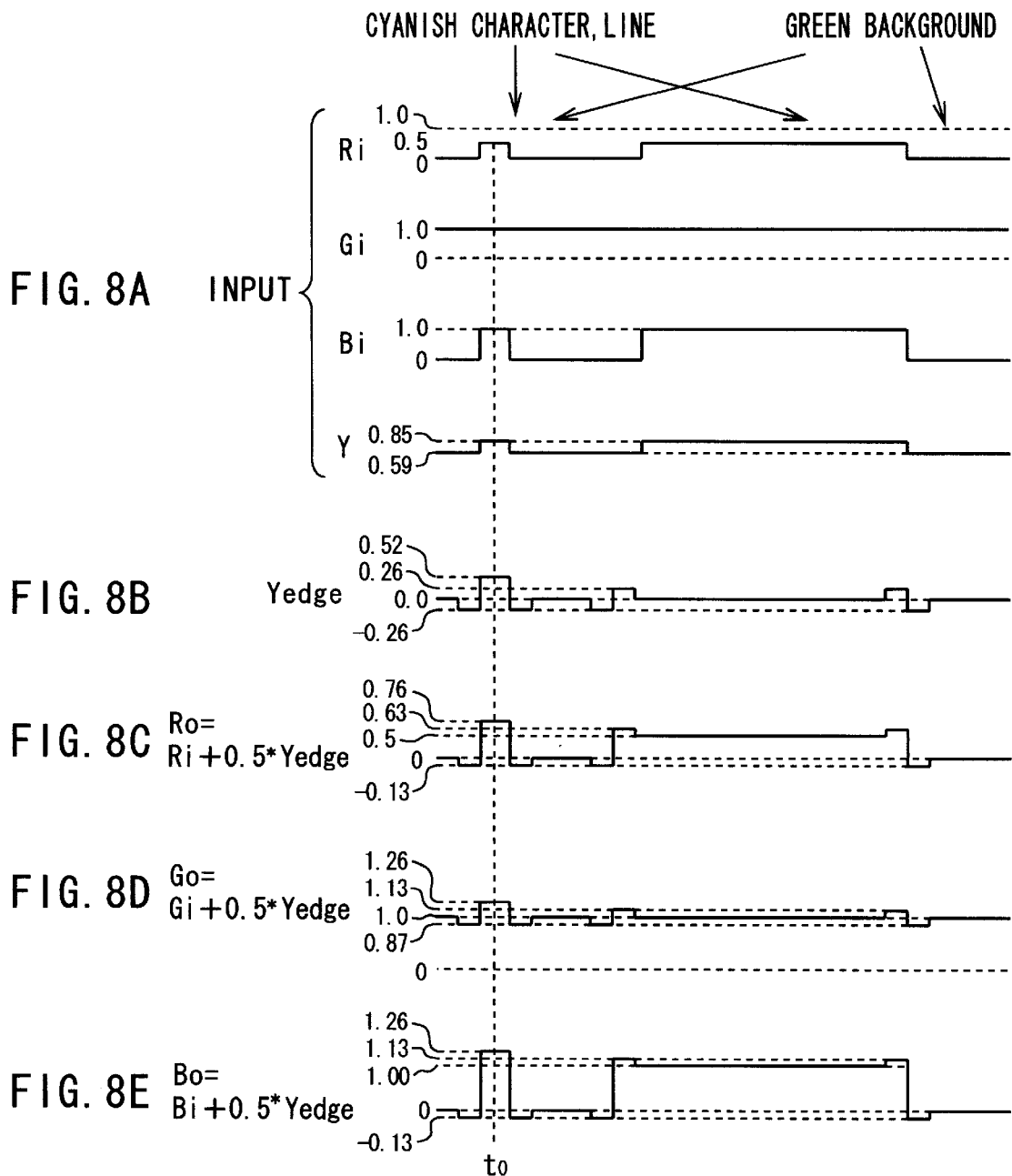

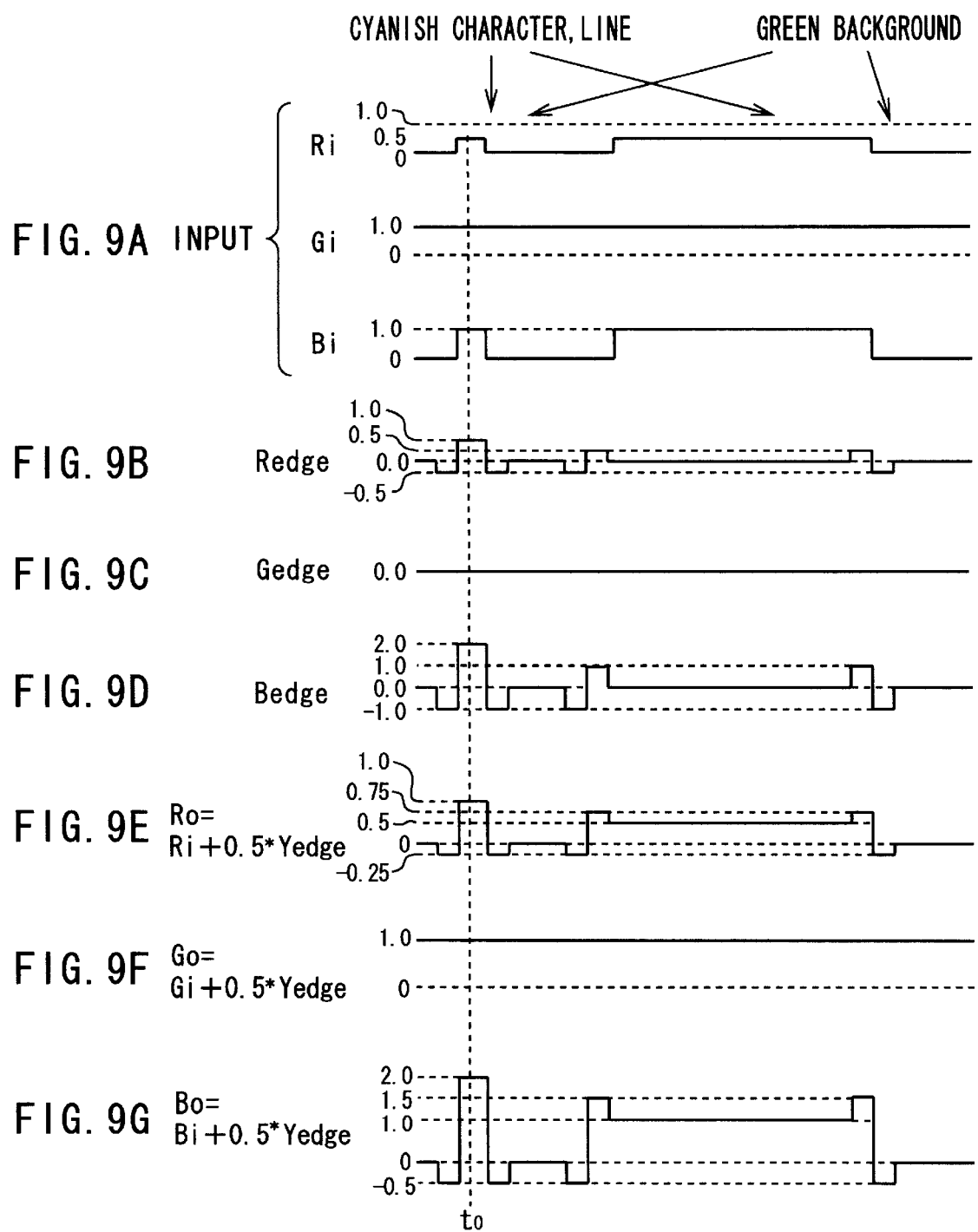

| INPUT SIGNAL FREQUENCY | | PLL SETTING | CORRECTION CIRCUIT SETTING | | |
|---|---|---|---|---|---|
| VERTICAL | HORIZONTAL | DIVISION RATIO | PC (peakcomp) | RC (risecomp) | FC (fallcomp) |
| 60Hz | 31.5kHz | 800 | 1.10 | 1.05 | 1.05 |
| 60Hz | 37.9kHz | 1056 | 1.15 | 1.10 | 1.10 |
| 75Hz | 60.0kHz | 1412 | 1.20 | 1.15 | 1.15 |
| 85Hz | 91.1kHz | 1728 | 1.50 | 1.25 | 1.25 |
| ⋮ | ⋮ | ⋮ | ⋮ | ⋮ | ⋮ |

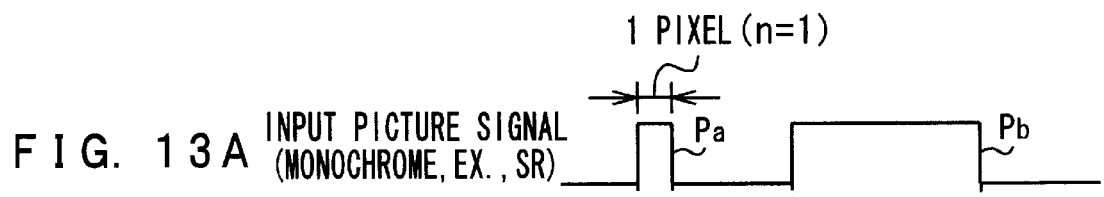
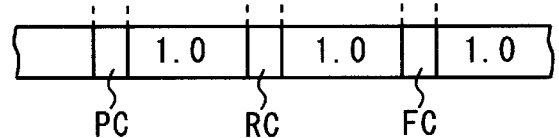
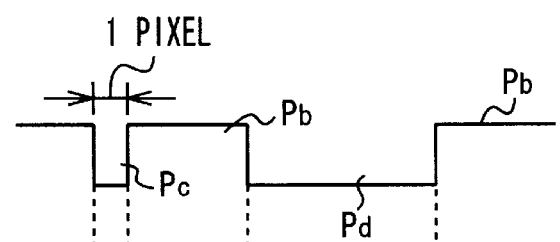
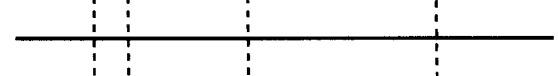
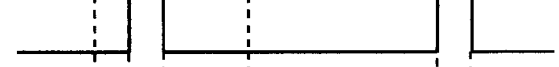
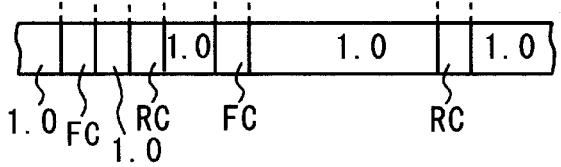

FIG. 18A
CATHODE INPUT SIGNAL WAVEFORM
WHEN DETERIORATED IN OUTPUT
SIGNAL TRANSMISSION SYSTEM
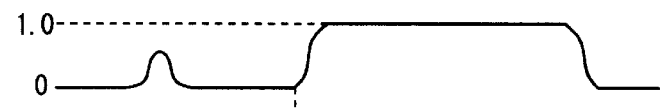

FIG. 18A'
BEAM RESPONSE LUMINANCE
DISTRIBUTION

FIG. 18B
AD-CONVERTED INPUT SIGNAL
WAVEFORM
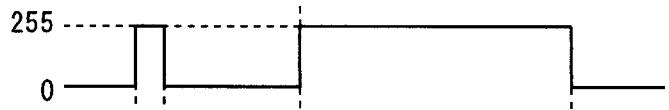

FIG. 18C    PDR

FIG. 18D    RDR

FIG. 18E    FDR
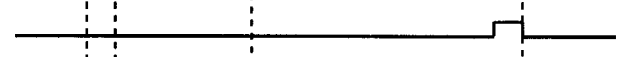

FIG. 18F
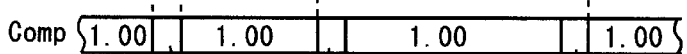

FIG. 18G
DIGITAL SIGNAL DATA CORRECTED
IN ACCORDANCE WITH THE PRESENT
INVENTION
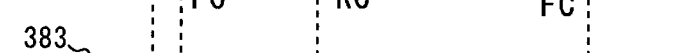

FIG. 18H
SIGNAL WAVEFORM CORRECTED IN
ACCORDANCE WITH THE PRESENT
INVENTION

(EXAMPLE WHEN PC = 1.5 AND RC = FC = 1.25)

FIG. 18I
BEAM RESPONSE LUMINANCE
DISTRIBUTION

FIG. 19A
CATHODE INPUT SIGNAL WAVEFORM
WHEN DETERIORATED IN OUTPUT
SIGNAL TRANSMISSION SYSTEM

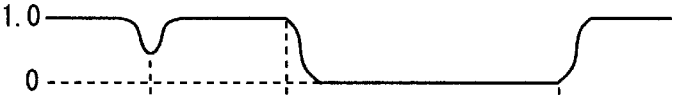

FIG. 19A'
BEAM RESPONSE LUMINANCE
DISTRIBUTION

FIG. 19B
AD-CONVERTED INPUT SIGNAL
WAVEFORM

FIG. 19C  PDR

FIG. 19D  RDR

FIG. 19E  FDR

FIG. 19F

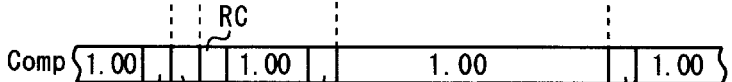

FIG. 19G
DIGITAL SIGNAL DATA CORRECTED
IN ACCORDANCE WITH THE PRESENT
INVENTION

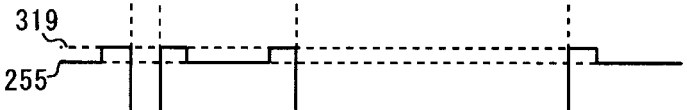

FIG. 19H
SIGNAL WAVEFORM CORRECTED IN
ACCORDANCE WITH THE PRESENT
INVENTION

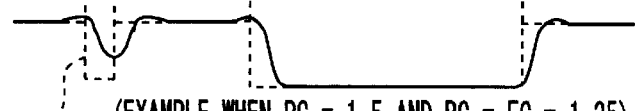

(EXAMPLE WHEN PC = 1.5 AND RC = FC = 1.25)
IDEAL WAVEFORM

FIG. 19I
BEAM RESPONSE LUMINANCE
DISTRIBUTION

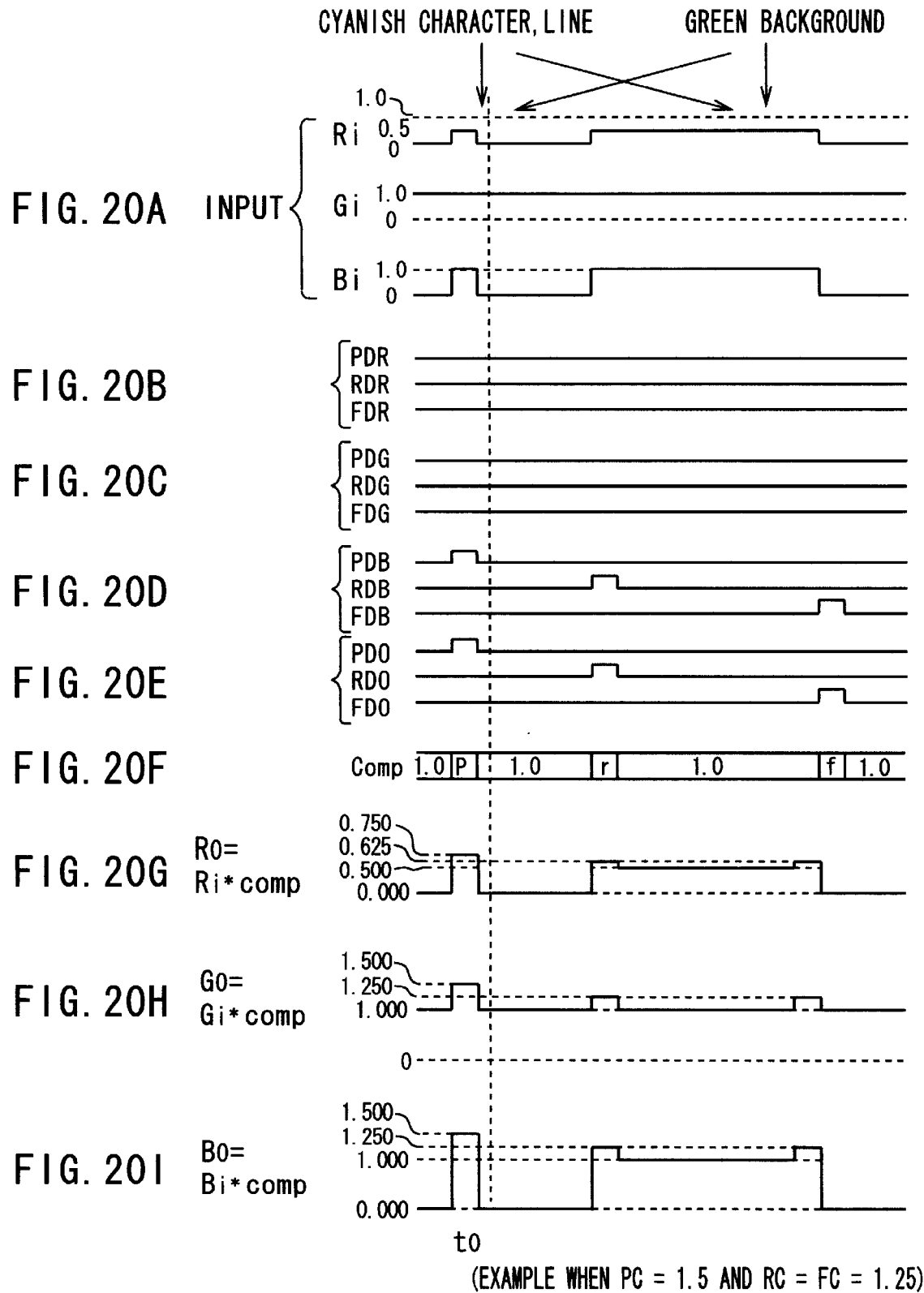

F I G. 2 1
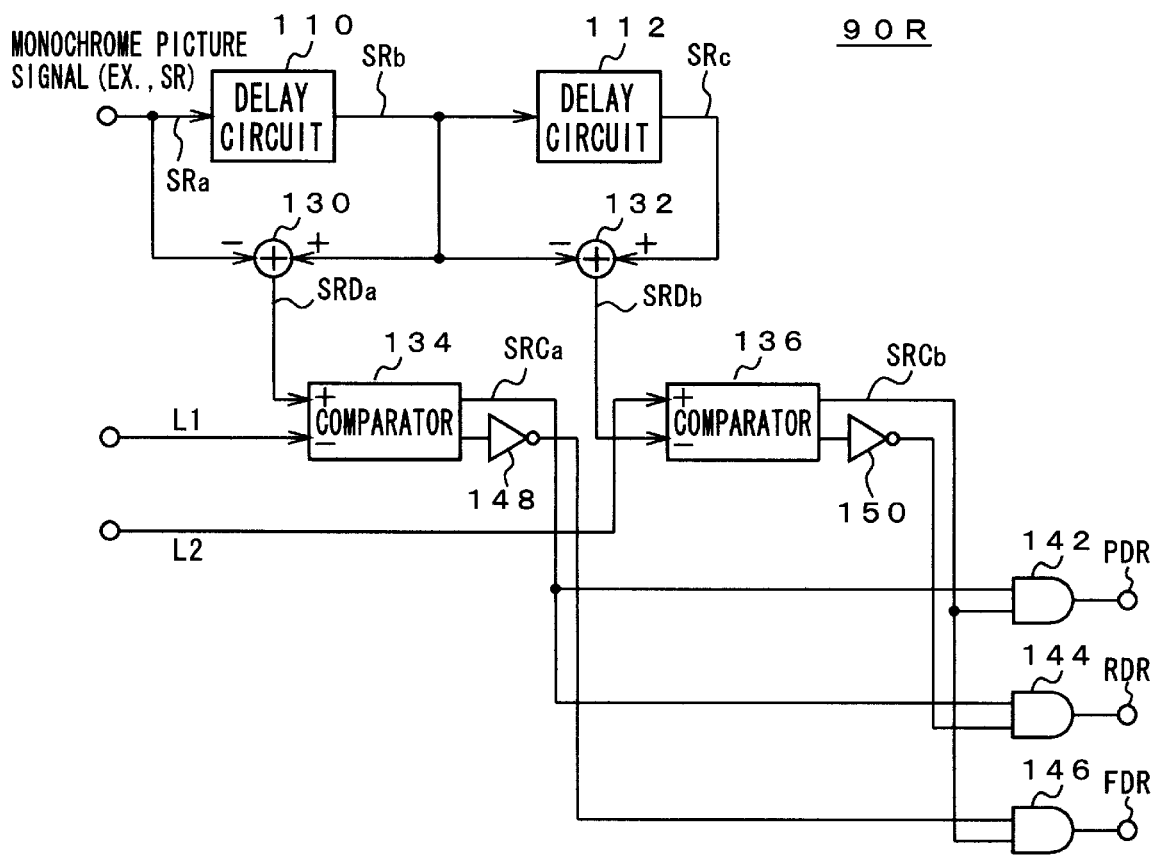

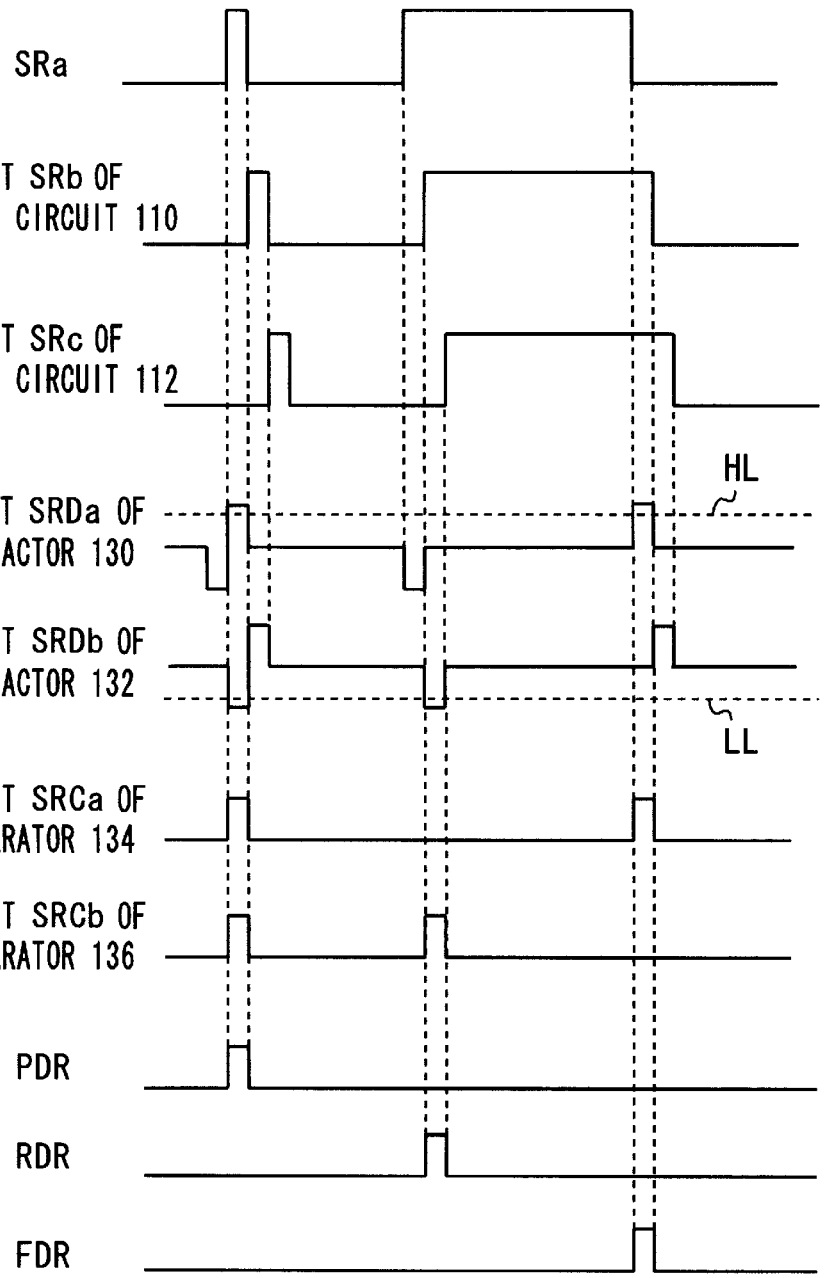
FIG. 22A  SRa
FIG. 22B  OUTPUT SRb OF DELAY CIRCUIT 110
FIG. 22C  OUTPUT SRc OF DELAY CIRCUIT 112
FIG. 22D  OUTPUT SRDa OF SUBTRACTOR 130
FIG. 22E  OUTPUT SRDb OF SUBTRACTOR 132
FIG. 22F  OUTPUT SRCa OF COMPARATOR 134
FIG. 22G  OUTPUT SRCb OF COMPARATOR 136
FIG. 22H  PDR
FIG. 22I  RDR
FIG. 22J  FDR

IMAGE PROCESSING DEVICE

TECHNICAL FIELD

The present invention relates to an image processing apparatus allowing a quality of image of a color cathode-ray tube (color CRT) to be improved when it is used as a picture monitor. More particularly, it relates to the one wherein a high horizontal spatial frequency picture pattern having a peak level and a picture pattern having an edge are extracted respectively, and separate corrections are performed on these picture patterns, thereby improving sharpness of the picture without losing the color saturation.

BACKGROUND ART

It is known that, with a picture display apparatus such as the color CRT used as a picture monitor, the waveform becomes dull by passage through signal transmission system of an input picture signal from a signal input unit to a cathode electrode of the color CRT. Further, it is not possible to ensure a sufficient bandwidth for a high input picture signal because of attenuation of a horizontal spatial frequency bandwidth due to the aperture effect in a color CRT display system.

It is known that the sharpness of the image is not sufficient for these reasons. Therefore, for example, when this picture monitor is used as a computer display or the like, it cannot show a small character clearly, so that small character information tends to become difficult to see. Further, particularly for thin line display, a white vertical line on a black background tends to be darker, and a black vertical line on a white background tends to thicken in the horizontal direction.

For this reason, an attempt has been made to sharpen the picture by using the following means in the art. First, for the dullness of the waveform generated in the signal transmission system, correction is made by using a peaking correction circuit. The peaking correction is a processing for compensating the lacking frequency bandwidth by performing a processing for increasing the gain with respect to a given specific horizontal frequency.

For changing the gain by the horizontal frequency, it is recommendable that the impedance determining the gain is allowed to have a frequency characteristic. A specific example of the peaking correction circuit will be described by reference to FIG. 1. A peaking correction circuit 10 is provided between a picture output stage and a cathode electrode of the color CRT, and a grounded emitter amplifier is used as the peaking correction circuit 10, as shown in FIG. 1.

An input picture signal such as a monochrome picture signal SR of R is supplied to a base terminal 12 of an NPN transistor Q. A collector thereof is connected to a power source +Vcc via a resistor 14 and an impedance element 16 which is a serial peaking correction element. Further, an emitter peaking circuit 20 of a resistor 20$a$ and a capacitor 20$b$ may be also connected in parallel to an emitter resistor 18 thereof.

Herein, the high frequency gain of the output picture signal is determined by the impedance element 16, the resistor 20$a$, and the capacitor 20$b$. Therefore, utilizing the peaking correction circuit 10 allows the gain for the high frequency component of the input signal frequency to increase, thereby compensating for the loss due to the signal transmission system.

The state of correction by peaking is shown in FIGS. 2A to 2C and FIGS. 3A to 3C. FIGS. 2A to 2C show the case of a white image on a black background, while FIGS. 3A to 3C show the case of a black image on a white background. FIGS. 2A and 3A show ideal waveforms, and FIGS. 2B and 3B respectively show the signal waveforms each deteriorated by passage through the signal transmission system. Then, FIGS. 2C and 3C respectively show the signal waveforms each improved by the peaking processing.

Due to the waveform deterioration in the signal transmission system, for FIG. 2B, white information on a black background darkens, and for FIG. 3B, the line width of black information on a white background increases, as well as the level of the black display portion of the signal increases, resulting in a deterioration in contrast of the detail (the vertical line of a character, or the like) to be expressed. The reduction in contrast is a serious problem particularly for a computer display. However, it is indicated that the reduction in level and the reduction in contrast are both improved by peaking correction as apparent from the waveform processings of FIGS. 2C and 3C.

On the other hand, for the aperture effect of a CRT display system, correction is performed by enhancing the edge of the input picture signal. The edge portion of a picture is enhanced by aperture correction whereby preshoot and overshoot are added to the edge portion, so that the apparent performances of the CRT display system are improved by this enhancement processing.

FIG. 4 shows a specific example of an aperture correction circuit 30. It has a pair of delay circuits 32 and 34 as well as the delay circuit 32 of the first stage receives an input picture signal from an input terminal 36. Its delay output is supplied to an adder 50. Then, an adder 46 adds the ones obtained by multiplying the inputs and outputs of the respective delay circuits 32 and 34 by coefficients ((−1) fold and two fold) as shown by means of coefficient multipliers 40, 42, and 44. The one obtained by multiplying the addition output SRe at a coefficient multiplier 48 is supplied to the adder 50, which adds it to the output picture signal.

FIGS. 5A to 5E are waveform diagrams each showing the operations wherein picture signals SRa and SRc respectively preceding and succeeding an input picture signal serving as a reference such as a monochromatic picture signal SRb by one pixel (FIGS. 5A to 5C) are obtained. These are subjected to coefficient multiplication and then passed to the adder 46, so that an edge signal SRe as shown in FIG. 5D is obtained. The coefficient multiplier 48 appropriately adjusts the gain thereof and the one thus adjusted is added to the reference picture signal SRb, thereby obtaining a picture signal SRo whose leading and trailing edges are respectively enhanced as shown in FIG. 5E.

Incidentally, if the peaking correction is performed, it is possible to improve the above described state in which white information on a black background darkens, and it is possible to improve the above described state in which the line width of black information on a white background appears to be large. Further, there are a feature that the deterioration in contrast is also eliminated, and other features.

However, if the peaking correction is performed, ringing occurs. Accordingly, particularly for the case as shown in FIG. 3C, the black information looks whitely edged, so that the quality of the image is largely impaired.

Further, even if ringing roughly has the amplitude characteristic due to the peaking processing, the group delay characteristic is difficult to flatten, and ringing increases with an increase in peaking amount.

Namely, for the peaking correction, the improvement in edge dullness and the inhibition of ringing are not completely compatible. This is because if the peaking amount is decreased, the improvement of the dullness of the edge is insufficient, but it is possible to inhibit ringing: in contrast, if the peaking amount is increased, it is possible to improve the dullness of the edge, but ringing becomes noticeable.

Peaking correction is performed using the resistor, the capacitor, the impedance element, and the like as described above. However, variations in constants of these elements, and variations in value due to the temperature characteristics occur, and hence stable peaking correction is impossible.

On the other hand, in aperture correction, the following problems are presented.

The width of the edge added by aperture correction equals to the unit delay time of the delay circuits 32 and 34 as apparent from FIGS. 5A to 5E. Essentially, the edge is added to a picture, and hence it is constant with respect to the spatial frequency. Namely, it should have a constant width on a screen.

However, in the case where the aperture correction processing is applied to a multi-scan monitor capable of varying the horizontal deflection frequency, when the horizontal deflection frequency is slow, the edge width on a screen narrows, while when the horizontal deflection frequency is rapid, the edge width widens. Too large edge width results in an image which appears to be edged, while too small width results in an image insufficiently corrected.

From these facts, if the aperture correction circuit 30 using the delay circuits 32 and 34 as shown in FIG. 4 is applied to a multi-scan monitor or a CRT monitor handling various display resolutions, it is not possible to obtain a satisfactory image quality.

For solving this problem, it is recommendable that the circuit configuration of FIG. 4 is configured by digital circuits. Further, when the delay circuits 32 and 34 are respectively made up of m flip-flop circuits and the clock thereof is set to be, for example, a pixel clock of the display image, it is possible to change the delay time into m types one pixel by one pixel, thereby solving it.

However, even when the aperture correction circuit 30 is configured as such a digital aperture correction circuit, the following problem remains.

The state of aperture correction by a digital method is described by reference to FIGS. 6A to 6D and FIGS. 7A to 7D. The delay time for aperture correction is defined as being for one pixel (1 dot).

FIGS. 6A to 6D show the case of a white image on a black background, and FIGS. 7A to 7D show the case of a black image on a white background. FIGS. 6A and 7A show ideal luminance waveforms. FIGS. 6B and 7B show the luminance waveforms deteriorated due to the aperture effect, and having lost the sharpness. FIGS. 6C and 7C are respectively luminance waveforms after aperture correction. FIGS. 6D and 7D show the luminance distribution waveforms when the picture signals subjected to aperture corrections have been added to a monitor.

Herein, as shown in FIG. 4, a picture signal is doubled at the coefficient multiplier 44, and the picture signal is multiplied (−1) fold at the coefficient multipliers 40 and 42. The multiplications by the coefficients are carried out at all of the edge portions of the input picture signal. However, essentially, the aperture correction processings are not required to be performed on all the picture components with a high horizontal frequency. In other words, in FIGS. 6A to 6D or FIGS. 7A to 7D, when a picture pattern Pa showing a thin line as configured by several pixels (n pixels) and a picture pattern Pb having a given width are present, if aperture correction is performed on the picture pattern Pb, the correction is such that respective edges become sharp. Accordingly, the sharpness is largely improved. Then, the coefficients of the coefficient multipliers 40 to 44 described above are selected such that the edge component can be extracted and improved in sharpness with respect to the picture pattern Pb.

For this reason, if the aperture correction is performed on the picture pattern Pa configured by a pattern for n pixels, and having a level of not less than the peak level, the result is slightly excessive correction, or potentially insufficient correction. This is because it is not possible to discriminate between the narrow-width picture pattern Pa as a thin line having a peak level and the broad-width picture pattern Pb, and to respectively correct them with a conventional aperture correction circuit.

Further, with such the conventional aperture correction circuit, the mixing ratio among R, G, and B is changed. This is because such an operation as to make the mixing ratio among R, G, and B constant is not performed with the conventional circuit. This improper correction causes a large problem that the color saturation of the image is changed.

This will be described by reference to FIGS. 8A to 8E and FIGS. 9A to 9G. For convenience of description, there will be shown the case where a picture signal made up of characters and lines in cyanish color, i.e., in a mixing ratio of R:G:B=0.5:1.0:1.0 on a green background has been inputted.

FIGS. 8A to 8E show a specific example of the aperture correction circuit whereby an edge correction signal is generated from a luminance signal Y, and this is added to each of the monochrome picture signals (primary color signals) R, G, and B to correct the sharpness thereof.

In FIG. 8A, the inputs of R, G, and B are set to be Ri, Gi, and Bi, respectively. For performing the aperture correction, first, the luminance signal Y is calculated from the following equation:

$$Y=0.30*Ri+0.59*Gi+0.11*Bi$$

An edge signal Yedge of the luminance signal Y is as shown in FIG. 8B. The edge signal Yedge is multiplied by an aperture correction coefficient K at the coefficient multiplier 48. Assuming that K=0.5, the resulting signal is added to the monochrome picture signals Ri, Gi, and Bi. As a result, corrected monochrome picture signals Ro, Go, and Bo as shown in FIGS. 8C, 8D, and 8E, respectively are obtained.

Herein, considering the timing for performing the edge correction (time point t0), the ratio of inputted monochrome picture signals is:

$$Ri:Gi:Bi=0.5:1.0:1.0=1:2:2$$

while the ratio of monochrome picture signals after aperture correction is:

$$Ro:Go:Bo=0.76:1.26:1.26=1:1.66:1.66$$

This indicates that the mixing ratio of R, G, and B is changed by performing the aperture correction processing, and the color saturation is changed.

FIGS. 9A to 9G show a specific example of the case where edge signals are generated from the monochrome picture signals R, G, and B themselves, and these are added to respective monochrome picture signals R, G, and B, thereby performing the aperture correction. Therefore, in this case, the aperture correction circuit is required for three channels of R, G, and B.

In this case, edge signals Redge, Gedge, and Bedge (FIGS. 9B, 9C, and 9D) are generated from the monochrome picture signals Ri, Gi, and Bi (FIG. 9A), respectively. The edge signals Redge, Gedge, and Bedge are multiplied by the coefficient K (=0.5) at the coefficient multiplier 48 as shown in FIG. 4, and the multiplication outputs are added to the original monochrome picture signals Ri, Gi, and Bi, respectively, at the adder 50. The addition results are shown in FIGS. 9E, 9F, and 9G.

For example, considering the monochrome picture signal R, the result is:

$$Ro=Ri+0.5*Redge$$

Also for other monochrome picture signals G and B, calculation can be performed in the same manner.

Therefore, considering the same timing (timing point t0) as in FIGS. 8A to 8E, the ratio of R, G, and B at this time is:

$$Ro:Go:Bo=1.0:1.0:2.0$$

This indicates likewise that the mixing ratio of R, G, and B is changed, and the color saturation is changed between input and output.

Therefore, when this aperture correction processing is applied to a computer display, it becomes impossible to reproduce the hue with fidelity. This indicates that the processing is not suitable for the application requiring high resolution and high fidelity.

DISCLOSURE OF THE INVENTION

This invention proposes an image processing apparatus capable of improving the sharpness without deteriorating the color reproducibility.

The image processing apparatus of this invention comprises pixel judgment means and pixel correction means each receiving digital input picture signal of R, G, and B, respectively, wherein the pixel judgment means includes target pixel detection means for detecting a target pixel having a peak level out of the input picture signal, and edge detection means for detecting an edge from a total of 2n+1 pixels of the target pixel and n pixels preceding and succeeding the target pixel, wherein the pixel correction means includes a correction coefficient selection means for selecting a peak level correction coefficient according to an output from the target pixel detection means, and for selecting an edge correction coefficient according to an output from the edge detection means, and wherein a level of the target pixel is corrected and an edge of the input picture signal is corrected with a pixel of the input picture signal being corrected according to the peak level correction coefficient and the edge correction coefficient, respectively.

In this invention, this image processing apparatus is configured so as to perform the function of aperture correction. It has a means for detecting a picture pattern identified by the signal levels of a total of (2n+1) pixels of the target pixel and at least n pixels (n is not less than 1. In the embodiments, it is assumed that n=1) preceding and succeeding the target pixel, or the signal level difference among these pixels for each of the RGB digital picture signals (monochrome picture signals).

Then, when a picture pattern to be corrected is detected for any one of R, G, and B, the correction determined based on the result obtained by performing such a logical or numerical processing that the detection result is reflected in a single or a plurality of output results is added to respective picture signals of R, G, and B to correct the picture pattern.

A narrow-width picture pattern such as a thin line pattern and a broad-width picture pattern are discriminated between each other, and respectively corrected in this manner. In consequence, it is possible to eliminate the excess or deficiency of the correction amount particularly with respect to the narrow-width picture pattern. Further, performing such an arithmetic processing of the correction amount that the ratio of R, G, and B becomes constant allows the edge correction to perform without changing the mixing ratio of R, G, and B. As a result, it is possible to improve the sharpness of the picture pattern. Since the image processing apparatus in accordance with this invention is based on digital processing, it is capable of performing a stable signal processing without being affected by variations in circuit elements.

As described above, according to this invention, it is so configured that the sharpness is improved by performing the respective individual correction processings on specific picture patterns.

This can improve the deterioration in sharpness when an image having a high horizontal spatial frequency is displayed without causing changes in edging and color saturation, thereby allowing small character information and the like to sharply show.

Further, in accordance with this invention, by appropriately selecting the correction coefficient and the like, it is possible to perform the optimum correction according to the signal characteristics such as frequency and resolution of the input signal, or the performances of each CRT monitor determined by the aperture characteristics of CRT, i.e., the relationship between the beam spot size and the display signal frequency, the frequency characteristics of a picture amplification circuit and the like.

BRIEF DESCRIPTION OF THE DRAWINGS

FIGS. 2A to 2C are waveform diagrams used for the operational description;

FIGS. 3A to 3C are waveform diagrams used for the operational description;

FIG. 4 is a connection diagram of an aperture correction circuit;

FIGS. 5A to 5E are waveform diagrams used for the basic operational description;

FIGS. 6A to 6D are waveform diagrams used for the description of the aperture correction operation;

FIGS. 7A to 7D are waveform diagrams used for the description of the aperture correction operation;

FIGS. 8A to 8E are waveform diagrams used for the description of the aperture correction operation;

FIGS. 9A to 9G are waveform diagrams used for the description of the aperture correction operation;

FIGS. 13A to 13J are waveform diagrams used for the operational description;

FIGS. 18A to 18I are waveform diagrams used for the description of the operation by peaking correction;

FIGS. 19A to 19I are waveform diagrams used for the description of the operation by peaking correction;

FIGS. 20A to 20I are waveform diagrams used for the description of the operation by aperture correction;

FIG. 21 is a system diagram of the essential parts showing another embodiment of the monochrome judgment circuit;

FIG. 22 is a waveform diagram used for the operational description; and

BEST MODE FOR CARRYING OUT THE INVENTION

A description will be given to the case where an embodiment of an image processing apparatus in accordance with this invention is applied to a picture display apparatus using a color CRT as a monitor by reference to FIG. 10.

Figure 1:
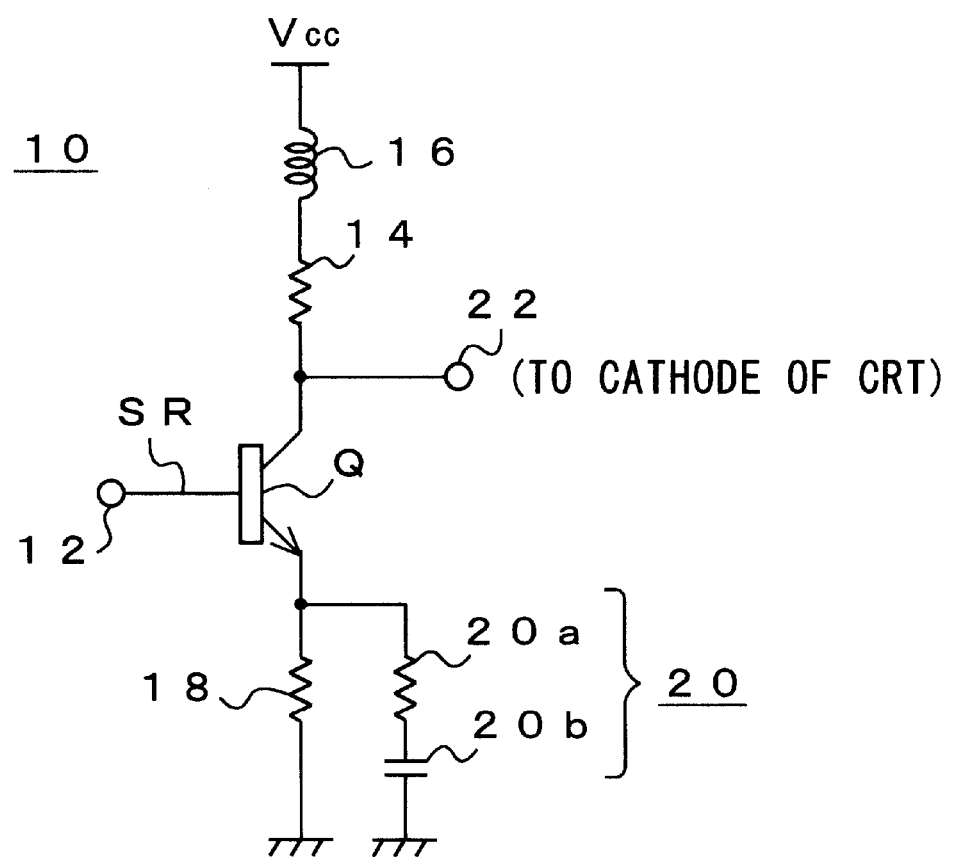
FIG. 1 is a connection diagram of a peaking correction circuit.
Figures 10, 11:
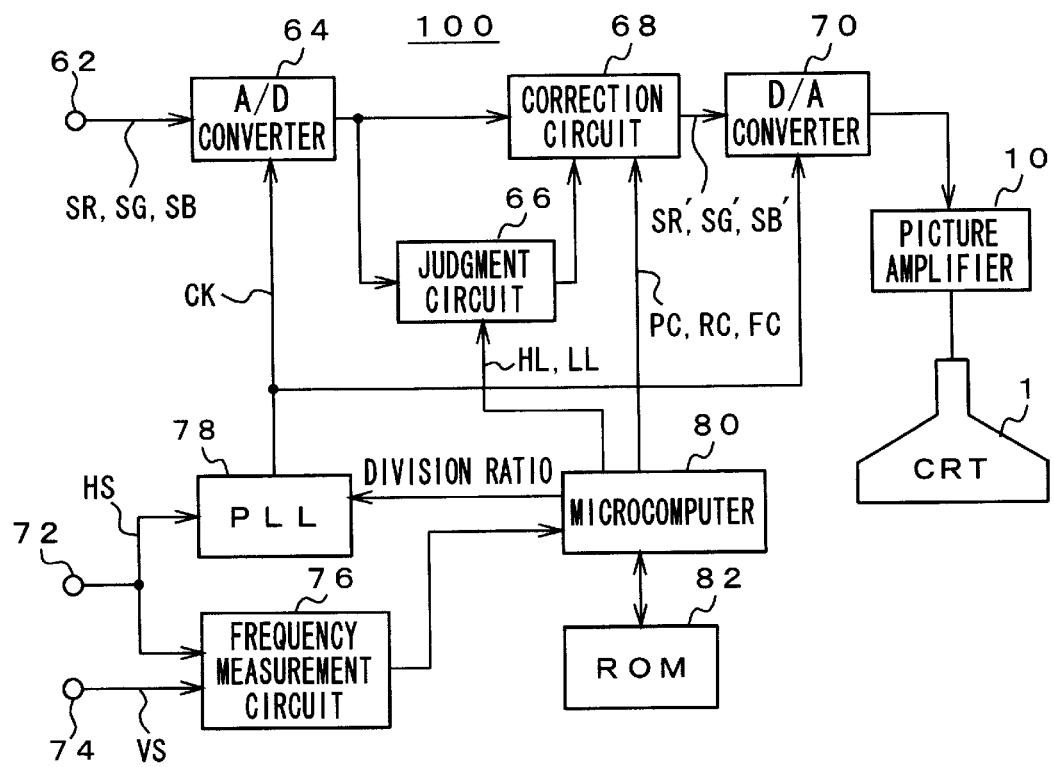
FIG. 10 is a system diagram of the essential parts showing an embodiment of an image processing apparatus in accordance with this invention.
FIG. 11 is a diagram showing the relationship among the input signal frequency, the division ratio, and the correction coefficient.

In the embodiment shown in FIG. 10, an image processing apparatus 100 in accordance with this invention is connected to a previous stage of a picture amplifier 10 connected to the cathode side of a color CRT 1.

The image processing apparatus 100 is a substitute for a conventional aperture correction circuit. In this invention, it detects a picture pattern (pixel pattern) identified by the signal levels of the target pixel and at least respective one pixels preceding and succeeding the target pixel, or the signal level difference among these pixels. When a picture pattern to be corrected is detected for any one of R, G, and B, the correction determined based on the results obtained by performing such logical or numerical processing that the detection result is reflected in a single or a plurality of output results is added to respective R, G, and B picture signals. Thus, the peak and the edge pattern are corrected out of the picture pattern.

To that end, first, after converting an input picture signal into digital form, what picture pattern the picture signal has become is determined on a monochrome basis for each color of R, G, and B. Then, according to the results obtained by performing the logical or numerical processing of 3 results, further according to the pixel clock frequency determined from the vertical synchronizing signal and the horizontal synchronizing signal of the input signal, such a correction amount as to give an optimum result is determined.

When each color of R, G, and B is judged, the results obtained by comparing a total of (2n+1) pixels of the target pixel and n pixels preceding and succeeding the target pixel (n is an integer) in height with M, for example, two judgment levels are logically or numerically processed. As a result, finally, the correction amount is uniquely determined for every pixel. By multiplying this correction amount to respective picture signals of R, G, and B, it is possible to perform the correction while keeping constant the ratio of R, G, and B signal levels of the input.

Therefore, this image processing apparatus 100 comprises a judgment circuit 66 functioning as a pixel judgment means, and a correction circuit 68 functioning as a pixel correction means.

Monochrome picture signals (analog signals) SR, SG, and SB for respective R, G, and B are supplied to an A/D converter 64 via a terminal 62, and converted to digital signals. The digitized monochrome picture signals SR, SG, and SB are individually supplied to the judgment circuit 66 and the correction circuit 68. At the judgment circuit 66, out of the input monochrome picture signals SR, SG, and SB, specific picture patterns are respectively judged. When such a specific picture pattern is present, the correction circuit 68 performs the level correction processing on the picture pattern to carry out the improvement processing of the sharpness.

The monochrome picture signals SR', SG', and SB' having improved sharpness are converted back to analog signals at a D/A converter 70. The analog monochrome picture signals SR', SG', and SB' are subjected to peaking processing at the picture amplifier 10, and then supplied to the color CRT 1.

The color CRT 1 is available for a multi-scanning use. Therefore, a horizontal synchronizing signal HS subjected to synchronizing separation from the input picture signal is supplied to both of a frequency measurement circuit 76 and a PLL circuit 78 via a terminal 72. Further, a vertical synchronizing signal VS subjected to synchronizing separation from the input picture signal is supplied to the frequency measurement circuit 76 via a terminal 74.

For the multi-scanning-capable picture display apparatus, a plurality of combinations of the horizontal frequency and the vertical frequency are present as shown in FIG. 11. Therefore, which pattern of frequencies make up the input picture signal is required to be determined. Accordingly, the frequency measurement circuit 76 judges the combination of frequencies.

The measured horizontal and vertical frequency values are supplied to a control unit 80 configured by a microcomputer. Then, by reference to a memory means 82 (such as a ROM) in which the information as in FIG. 11 is stored, a division ratio determined by the measured frequencies is supplied to the PLL circuit 78. For example, when the horizontal frequency is 91.1 kHz, and the vertical frequency is 85 Hz, a division ratio "1728" is selected. The PLL circuit 78 is driven by this division ratio, and a clock CK configured with a frequency appropriate to this division ratio is generated. By this clock CK, the monochrome picture signals SR, SG, and SB are subjected to digital conversion, and converted back to analog signals.

From the control unit 80, m reference levels are prepared for picture pattern judgment with respect to the judgment circuit 66. In this embodiment, reference levels HL and LL of two high and low values are supplied. The memory means 82 also stores correction coefficients PC, RC, and FC (the detail will be described later), as shown in FIG. 11, for improving the sharpness on the picture pattern other than the division ratio for the PLL circuit 78. The correction coefficient PC is a peak level correction coefficient corresponding to the picture pattern Pa of which the peak level is made up of n consecutive pixels. For convenience of description, the case where n=1 will be illustrated.

Whereas, the correction coefficients RC and FC are edge correction coefficients each corresponding to the picture pattern Pb of which the peak level is made up of not less than (n+1) consecutive pixels. These correction coefficients PC, RC, and FC are stored in the memory means 82 such as a ROM together with the division ratio and the like, and supplied to the judgment circuit 66 and the correction circuit 68 via the control unit 80.

The configuration of each unit in the image processing apparatus 100 thus configured will be described by reference to FIG. 12 and subsequent figures.

The judgment circuit 66 judges the peak and the edge pattern by using a total of (2n+1) pixels of the target pixel and n pixels preceding and succeeding the target pixel. Therefore, out of the input picture signal, the picture pattern Pa made up of the target pixel having a peak level, in other words, the pattern Pa wherein the peak level is made up of n consecutive pixels is detected. In addition, both edges of the picture pattern Pb wherein the peak level is made up of not less than (n+1) pixels are detected.

Figure 12:
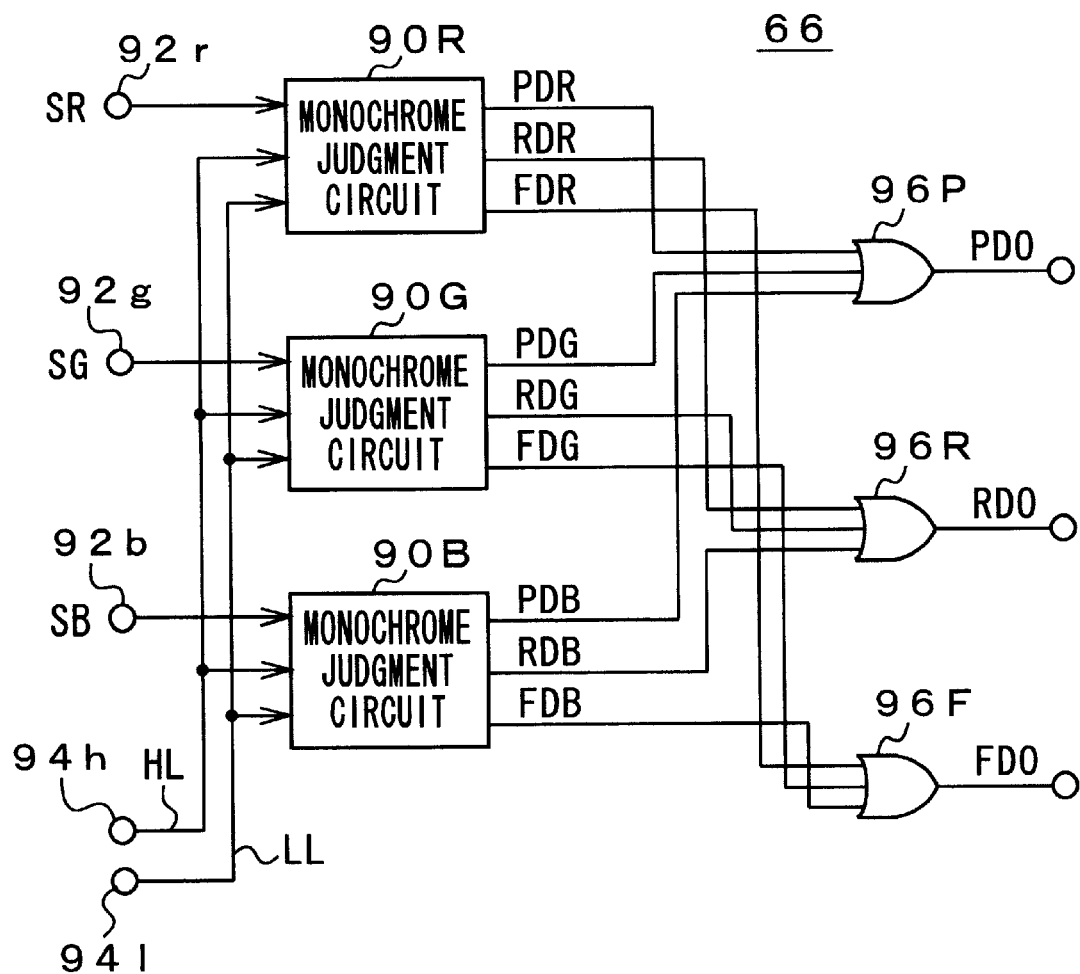
FIG. 12 is a system diagram of the essential parts showing an embodiment of a judgment circuit.

The judgment circuit 66 judges the specific picture pattern described above for each color of R, G, and B using monochrome judgment circuits 90R, 90G, and 90B as shown in the embodiment in FIG. 12. To that end, to the monochrome judgment circuit 90R, a monochrome picture signal SR of R is supplied from a terminal 92r. Hereinafter, in the same manner as above, to the monochrome judgment circuit 90G, a monochrome picture signal SG of G is supplied from a terminal 92g, and to the monochrome judgment circuit 90B, a monochrome picture signal SB of B is supplied from a terminal 92b.

Further, to these monochrome judgment circuits 90R to 90B, a high-level reference level HL is supplied in common from a terminal 94h, and a low-level reference level LL is supplied in common from a terminal 94l for level judgment of the picture pattern.

These reference levels HL and LL are both used for eliminating the picture signal having an ordinary level, and detecting only the specific picture patterns Pa and Pb each having a large level. In this embodiment, the reference level HL is set to be the level close to roughly 90% of the white level. Whereas, the other reference level LL is set to be the level of roughly 10% up of the black level.

Subsequently, a judgment example at the monochrome judgment circuit 90R when it is set that n=1 is shown in FIGS. 13A to 13E. FIG. 13A is an example of picture patterns Pa and Pb. At the time of the picture pattern Pa for a pixel, which is a narrow-width peak pattern, the monochrome judgment circuit 90R delivers the same peak detection pulse PDR as the pattern (FIG. 13B). At the time of the picture pattern Pb, which is broader than this and is made up of not less than two pixels, it delivers a detection pulse RDR corresponding to the leading edge portion, and a detection pulse FDR corresponding the trailing edge portion (FIGS. 13C and 13D).

At the time of a picture pattern of FIG. 13F in white/black inverted relation to FIG. 13A, the pattern can also be considered to be made up of a picture pattern Pc made up of a black level for one pixel, and a picture pattern Pd of a black level made up of not less than one pixels. Alternatively, it can be considered to be the picture pattern in which all of not less than one pixels preceding and succeeding the picture pattern Pb is black level.

Therefore, the peak detection pulse PDR cannot be obtained (FIG. 13G). However, since the picture pattern Pb is present, in this case, the edge detection pulses RDR and FDR are obtained at their respective edge portions (FIGS. 13H and 13I). Thus, the detection pulses PDR, RDR, and FDR responding for the specific picture patterns Pa and Pb are respectively obtained.

Respective monochrome judgment circuits 90G and 90B of G and B also judge their respective picture patterns Pa and Pb. When the corresponding picture patterns are present, the detection pulses (PDG, RDG, and FDG) and (PDB, RDB, and FDB) are obtained from the monochrome judgment circuits 90G and 90B, respectively.

From the foregoing description, each of the monochrome judgment circuits 90R, 90G, and 90B has a level judgment function of judging the level of the target pixel and the pixels preceding and succeeding the target pixel, and an edge judgment function of judging the leading and trailing edges of the target pixel.

Out of the detection pulses judged in the foregoing manner, the detection pulses corresponding to the same picture pattern are respectively supplied to their respective corresponding common OR circuits 96P, 96R, and 96F, and ORed. Therefore, when the objective picture pattern Pa or Pb is present in any of respective monochrome picture signals SR, SG, and SB, the corresponding OR outputs PDO, RDO, and FDO are obtained. These OR outputs PDO, RDO, and FDO are supplied to the correction circuit 68.

Since the monochrome judgment circuits 90R to 90B are the same in configuration, for example, only the monochrome judgment circuit 90R of R will be described, and a description on other configurations and the operations are omitted.

Figure 14:
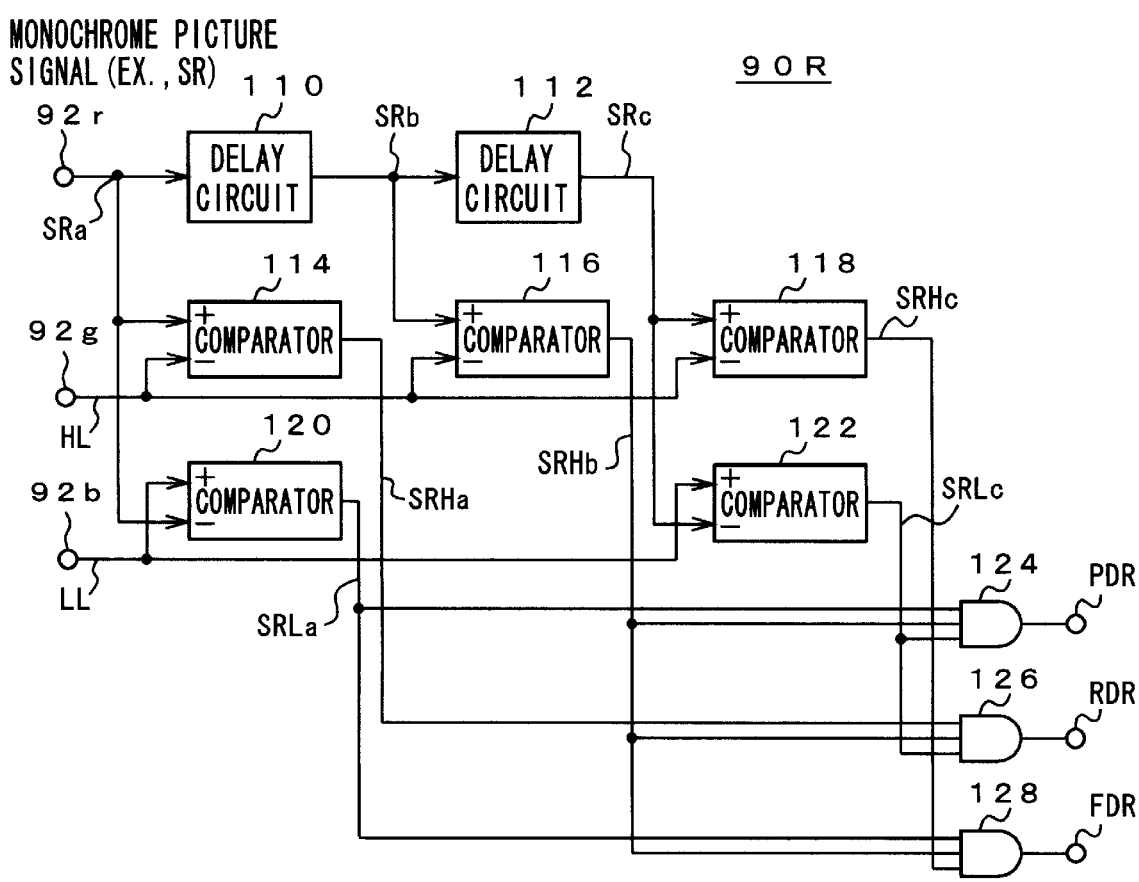
FIG. 14 is a system diagram of the essential parts showing an embodiment of a monochrome judgment circuit.

FIG. 14 shows an embodiment of the monochrome judgment circuit 90R of R. A description will be given by reference to FIGS. 15A to 15K.

The monochrome judgment circuit 90R comprises a pair of cascaded delay circuits 110 and 112. Both of these are made up of flip-flop circuits. To the delay circuit 110 of the first stage, the monochrome picture signal SR (SRa) of R is supplied. Therefore, upon input of the monochrome picture signal SRa as shown in FIG. 15A, monochrome picture signals SRb and SRc shifted by one pixel respectively shown in FIGS. 15B and 15C are obtained from the delay circuits 110 and 112, respectively.

For convenience of description, if it is assumed that the monochrome picture signal SRb obtained as the output from the delay circuit 110 of the first stage is a target pixel, the input thereof is the succeeding pixel, and the monochrome picture signal SRc obtained as the output from the delay circuit 112 of the subsequent stage is the preceding pixel.

Figure 15:
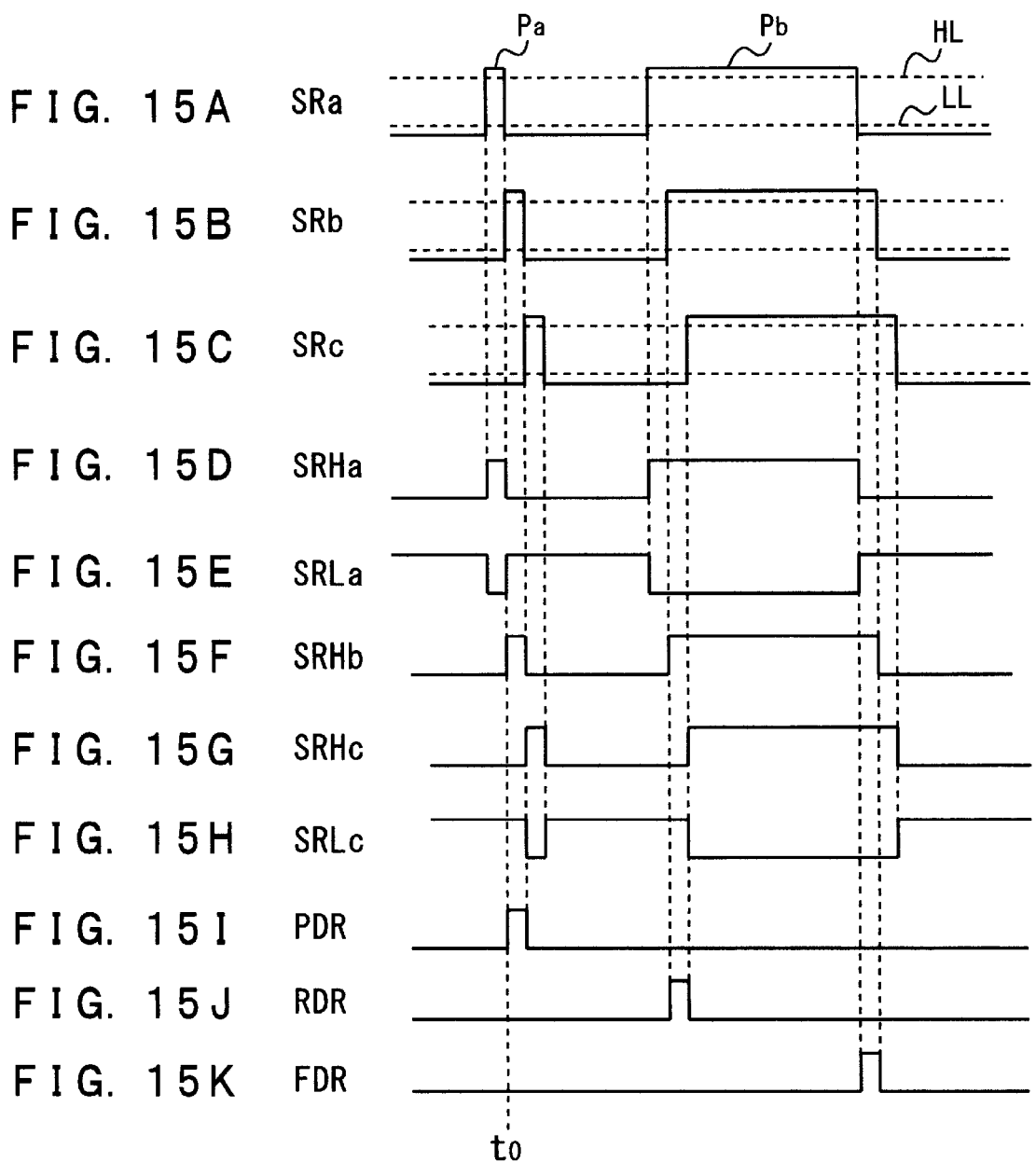
FIGS. 15A to 15K are waveform diagrams used for the operational description.

The monochrome picture signals SRa, SRb, and SRc are supplied to comparators 114, 116, and 118, respectively, and compared in level with the high-level reference level HL (see FIG. 15A). By the level comparison, comparison outputs SRHa, SRHb, and SRHc shown in FIGS. 15D, 15F, and 15G, respectively are obtained therefrom.

Further, the monochrome picture signals SRa and SRc are supplied to comparators 120 and 122, respectively, and compared with the low-level reference level LL (see FIG. 15A). Comparison outputs SRLa and SRLc shown in FIGS. 15E and 15H, respectively are obtained therefrom.

These comparison outputs are supplied to their respective corresponding AND circuits 124, 126, and 128. The first AND circuit 124 is used for detecting the picture pattern Pa. To this, the comparison output SRHb from the comparator 116, and the comparison outputs SRLa and SRLc respectively from the comparators 120 and 122 are supplied. When all of the levels of the pixels preceding and succeeding the target pixel are high level (FIGS. 15D, 15E, and 15H), it judges the target pixel as being the specific picture pattern Pa, and delivers a detection pulse (AND output) PDR (FIG. 15I).

Incidentally, even if the picture pattern Pb of consecutive high levels for several pixels is inputted with respect to the picture pattern Pa having a peak level for one pixel, this is not identified as the picture pattern Pa for one pixel for the following reason. In this case, the respective comparison outputs SRHb and SRLa from the comparators 116 and 122 become high level, but the comparison output SRLa from the comparator 120 becomes low level. Therefore, by AND-ing such outputs, it is possible to discriminate the picture pattern Pa having a peak level for one pixel with reliability.

The second AND circuit 126 is a logical circuit for detecting the leading edge portion. In this case, other than the comparison output SRHb from the comparator 116, the respective comparison outputs SRHa and SRLc from the comparators 114 and 122 are supplied to the second AND circuit 126, and ANDed. At this step, the detection pulse RDR as shown in FIG. 15J is obtained in association with the picture pattern Pb.

Also in this second AND circuit 126, only for the high-level picture pattern Pb of a plurality of consecutive pixels, the detection pulse RDR corresponding to the leading edge portion is obtained and no response occurs to the picture pattern Pa for one pixel. This is because, at the timing to of detecting the picture pattern Pa (timing at which the target pixel is positioned), the comparison outputs SRHb and SRLc are high level, while the comparison output SRHa is low level.

The third AND circuit 128 provides the detection pulse FDR corresponding to the trailing edge portion out of the picture pattern Pb. To that end, other than the respective comparison outputs SRHb and SRHc from the comparators 116 and 118, the comparison output SRLa from the comparator 120 is supplied to the AND circuit 128. As a result, only for the trailing edge portion of the picture pattern Pb, the comparison outputs SRLa, SRHb, and SRHc from the three units become high level, and at this timing, the detection pulse FDR is obtained (see FIG. 15K). Also from the third AND circuit 128, an AND output is obtained only for the picture pattern Pb, and no AND output is obtained for other picture patterns.

With such a configuration, the detection pulses PDR, RDR, and FDR corresponding to their respective specific picture patterns of the monochrome picture signal SR of R are obtained. Also in the monochrome judgment circuits 90G and 90B with respect to other monochrome picture signals, the same processings are performed to detect the specific picture patterns Pa and Pb contained in their respective picture signals. Their respective detection pulses are merged at the OR circuits 96R, 96G, and 96B shown in FIG. 12, resulting in selection pulses PDO, RDO, and FDO, respectively.

Figure 16:
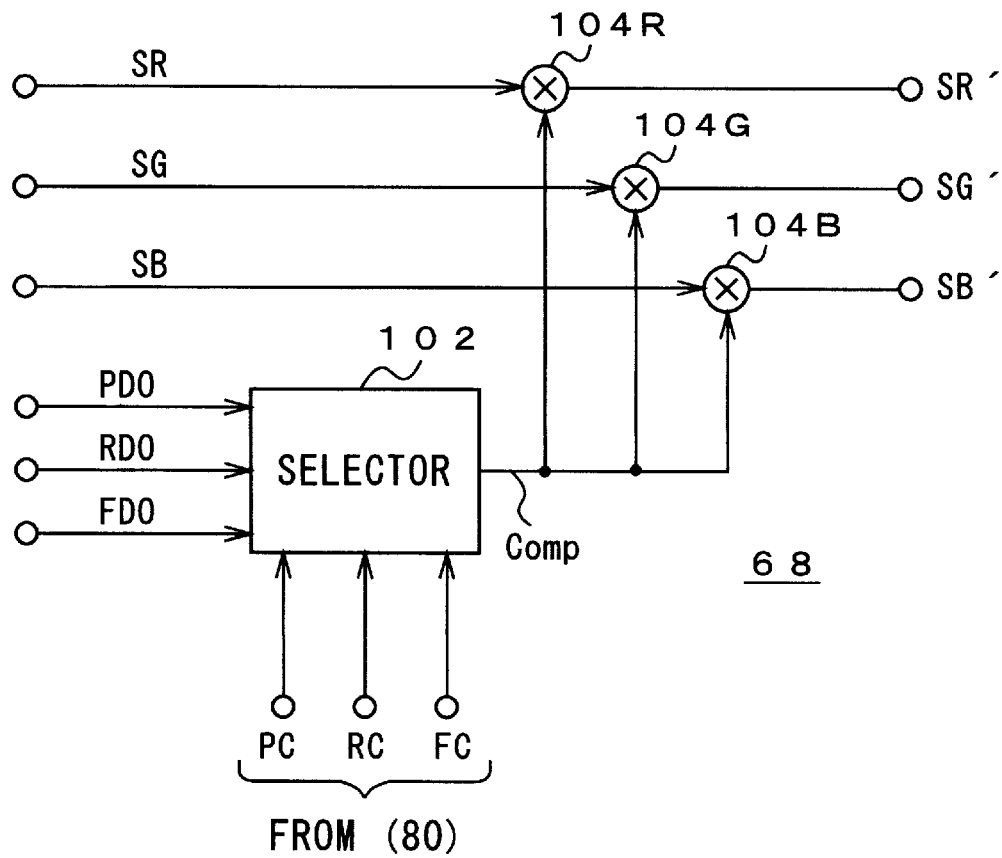
FIG. 16 is a waveform diagram of the essential parts showing an embodiment of a correction circuit.

Subsequently, an embodiment of the correction circuit 68 will be described by reference to FIG. 16. The correction circuit 68 comprises a selector 102 for selecting the correction coefficients PC, RC, and FC corresponding to a picture pattern, and multipliers 104R, 104G, and 104B for multiplying the selected correction coefficient and the input monochrome picture signal.

To the selector 102, the correction coefficient PC, RC, or FC corresponding to the picture pattern is supplied from the control unit 80 by reference to the memory means 82. As shown in FIG. 11, for the portion corresponding to the picture pattern Pa, the correction coefficient PC is used as the correction coefficient for the peak level. As the respective correction coefficients at the leading and trailing edge portions in the picture pattern Pb, the correction coefficients RC and FC are used. In this embodiment, the respective correction coefficients RC and FC used for the edge portions are the same value. Both of the correction coefficients are not less than 1.0, and the value of PC is a larger value than RC and FC.

In the selector 102, the selection pulses PDO, RDO, and FDO are used for selecting the correction coefficients PC, RC, and FC, respectively. In other words, since the selection pulse PDO corresponds to the picture pattern Pa, the correction coefficient PC is selected when the selection pulse PDO has been obtained (see FIGS. 13E and 13J). For the same reason, when the selection pulse RDO has been obtained, the correction coefficient RC for the leading edge portion is selected. When the selection pulse FDO has been obtained, the correction coefficient FC for the trailing edge portion is selected. No correction is made on the picture area other than the peak level and the edge, and hence the correction coefficient at that time is 1.0.

The selected correction coefficient is supplied in common to the multipliers 104R, 104G, and 104B, and multiplied to the monochrome picture signals SR, SG, and SB, respectively. As a result, the monochrome picture signals SR', SG', and SB' corrected in level and improved in dullness of waveform are outputted.

The monochrome picture signals SR', SG', and SB' are converted back to analog signals at the D/A converter 70 shown in FIG. 10. Herein, the output from the correction circuit 68 is increased by the correction amount (by the amount resulting from multiplication by the correction coefficient) as compared with the input. Therefore, for performing analog conversion without degrading the resolution in the direction of amplitude of the signal subjected to digital conversion, the dynamic range is required to be enlarged by the correction amount.

Figure 17:
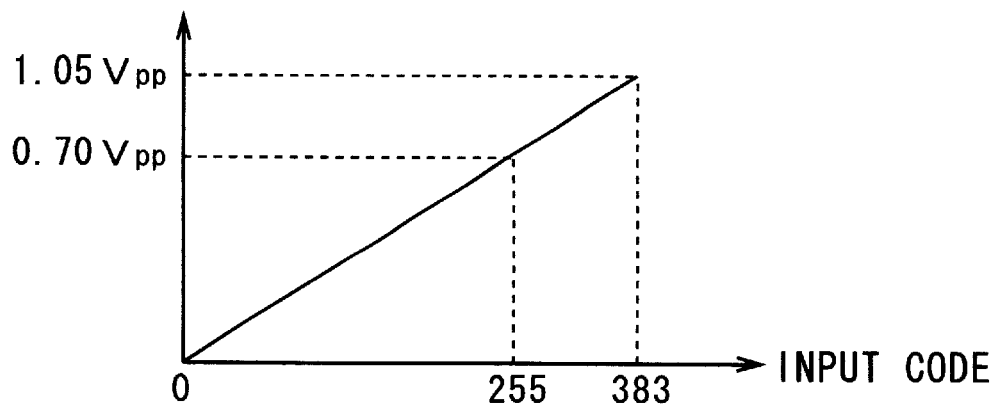
FIG. 17 is a waveform diagram showing the input and output characteristics of an A/D converter.

Therefore, in this embodiment, as shown in FIG. 17, the input and output characteristics of the D/A converter 70 are enlarged. For example, if it is assumed that the output is enlarged up to 150% by multiplication processing when the D/A converter 70 has an 8-bit output and an output amplitude of 0.7 Vpp, the dynamic range may be 50% enlarged so that an output amplitude of 1.05 Vpp for an input value of 383 is obtained relative to an output amplitude of 0.7 Vpp for an input value of 255 as shown in the diagram.

The D/A converter 70 is generally so configured that the output amplitude can be determined based on the externally applied reference voltage and the external resistance. Therefore, it is recommendable that a not less than 9-bit D/A converter is prepared, and adjusted so as to obtain the input and output characteristics as shown in FIG. 17. It is also possible to perform compression processing so as to make the multiplication output fall within a range up to a maximum value of 255, not enlarging the dynamic range.

Subsequently, the waveform improvement and the color saturation in a picture display apparatus when the image processing apparatus 100 in accordance with this invention thus configured is used will be analyzed.

First, even if the peaking correction is performed by using the monochrome picture signals SR', SG', and SB' obtained by the use of the image processing apparatus 100 shown in FIG. 10, the ringing as in the art is not generated. In other words, it is possible to correct the dullness of the picture waveform while inhibiting the ringing.

As for a picture signal having white information on a black background, a description will be given by reference to FIGS. 18A to 18I. In FIGS. 18A to 18I, for facilitating the description, it is assumed that all of R, G, and B have the same waveform, and it is assumed that the monochrome picture signal of R is shown in the figure. Then, it is assumed that according to a result of horizontal and vertical frequency measurements, as the correction coefficients,

PC=1.5

RC=1.25

FC=1.25 have been selected as shown in FIG. 11.

Incidentally, with the correction coefficients PC, RC, and FC shown in FIG. 11, the higher the horizontal and vertical frequencies of the input signal is, the larger values the correction coefficient values are. This is because the peak level of a beam spot is reduced due to the aperture effect of the signal transmission system and a monitor 1 with an increase in input frequency. For compensating the reduction in peak level, the correction coefficient values increases with an increase in input frequency.

Further, FIGS. 18A and 18B show input signal waveforms obtained by A/D converting a signal waveform deteriorated in the signal transmission system, and a signal not undergoing waveform deterioration, respectively. Further, the beam response luminance distribution when the signal waveform of FIG. 18A has been added has a more dull form shown in FIG. 18A' than the one shown in FIG. 18A. From the signal waveform of FIG. 18B, the detection pulses PDR, RDR, and FDR shown in FIGS. 18C, 18D, and 18E, respectively, are obtained at the judgment circuit 66. Then, by the selection pulse comp (PDO, RDO, and FDO) ORed according to these detection pulses PDR, RDR, and FDR, the foregoing correction coefficients are selected, and the result is as shown in FIG. 18F.

At the picture pattern Pa, the correction coefficient (PC=1.5) is selected. At the picture pattern Pb, the correction coefficients (RC=FC=1.25) at respective edge portions are selected. Since no correction is made on other picture areas, each of the correction coefficients at the picture areas is 1.0.

As a result, at the picture pattern Pa, as shown in FIG. 18G, since PC=1.5, the level is corrected to:

(255*1.5)=383

At the leading and trailing edge portions of the picture pattern Pb, respectively, RC=FC=1.25, so that the level is corrected to:

(255*1.25)=319

Upon D/A converting the corrected digital picture signal, as well as passing it through the signal transmission system, the deterioration of the signal occurs, resulting in the signal waveform as shown in FIG. 18H. At the picture pattern Pa out of this, a signal waveform slightly deteriorated than the value of FIG. 18G occurs, but the level is not less than 1.0, resulting in an appropriate value as shown FIG. 18I in terms of the peak response luminance distribution. This is due to the waveform deterioration resulting from the aperture effect. However, if the foregoing correction coefficients are employed in consideration of the aperture effect, it is also possible to effectively suppress the overshoot amount in the picture pattern Pb. In consequence, the level becomes minimal, and becomes almost inconspicuous.

As for a picture signal having black information on a white background, the result is as shown in FIGS. 19A to 19I. As apparent from the waveform diagrams of FIGS. 19H and 19I, it is possible to improve the line width of the picture pattern Pa than in the art. The other processings are the same as with FIGS. 18A to 18I, and hence the description thereon is omitted.

Then, a consideration will be given to the effect on the color saturation when correction processing has been performed by the image processing apparatus 100 in accordance with this invention.

A description will be given based on a signal in which cyanish characters and lines are present on a green background as illustrated in FIGS. 9A to 9G as an input picture signal. As for the reference levels HL and LL to be used for level judgment of the input picture signal, it has been assumed that HL=0.9 and LL=0.1 similarly as described above. Further, the level relationship for a picture signal such as a cyanic character on a green background is assumed to be, as shown in FIG. 20A:

$Gi=1.0$ $Ri=0.5$ $Bi=1.0$

As a result, from the respective monochrome judgment circuits 90R and 90G of R and G, the detection pulses (PDR, RDR, and FDR) and (PDG, RDG, and FDG) are not obtained as with FIGS. 20B and 20C.

In contrast, from the monochrome judgment circuit 90B of B, the detection pulses (PDB, RDB, and FDB) as shown in FIG. 20D are obtained. Therefore, the same selection pulses PDO, RDO, and FDO as these are obtained (see FIG. 20E). The correction coefficients PC, RC, and BC are selected based on the selection pulses PDO, RDO, and FDO, and hence the selection output comp becomes the calculated value as shown in FIG. 20F. Upon multiplying the selection output comp and the monochrome picture signals (FIG. 20A), the respective monochrome picture signals SR' (=Ro), SG' (=Go), and SB' (=Bo) become these as shown in FIGS. 20G, 20H, and 20I. Considering the picture pattern Pa portion (time point t0):

$SR'=0.5*1.5=0.75$ $SG'=1.0*1.5=1.5$ $SB'=1.0*1.5=1.5$

Herein, considering the R, G, and B mixing ratio at the timing t0 when the picture pattern Pa is obtained, the result is:

$SR':SG':SB'=0.75:1.5:1.5=1:2:2$

The R, G, and B mixing ratio at the time of input is:

$SR:SG:SB=0.5:1.0:1.0=1:2:2$

Thus, the mixing ratio shows almost no change, and is held constant. In other words, even if the foregoing processing is performed, the color saturation shows no change.

FIG. 21 is a system diagram showing another embodiment of the monochrome judgment circuit 90R of R out of the monochrome judgment circuits 90R, 90G, and 90B. Also with this configuration, the circuit has a pair of delay circuits 110 and 112 using flip-flop circuits and the like.

The input and output signals SRa and SRb (FIGS. 22A and 22B) of the one delay circuit 10 are supplied to a first adder 130, and added with the polarities shown, thereby to obtain a difference signal SRDa therebetween (FIG. 22D). Similarly, the input and output signals SRb and SRc (FIGS.

22B and 22C) of the other delay circuit 112 are supplied to a second adder 132, and added with the polarities shown, thereby to obtain a difference signal SRDb therebetween (FIG. 22E).

The first difference signal SRDa is supplied to a first comparator 134, and subjected to level comparison with a level L1 corresponding to the difference between high level and low level. When its level is higher than the reference level HL, a high-level comparison output SRCa is obtained (FIG. 22F).

Similarly, the second difference signal SRDb is supplied to a second comparator 136, and subjected to level comparison based on a level L2 corresponding to the difference between low level and high level. When its level is lower than the reference level LL, a high-level comparison output SRCb is obtained (FIG. 22G).

Then, the comparison output SRCa from the first comparator 134 is supplied to first and second AND circuits 142 and 144, and the comparison output inverted at an inverter 148 is supplied to a third AND circuit 146. Further, the comparison output SRCb obtained from the second comparator 136 is supplied to the first and third AND circuits 142 and 146, and the comparison output inverted at an inverter 150 is supplied to the second AND circuit 144.

As a result, the detection pulse PDR corresponding to the picture pattern Pa is obtained from the first AND circuit 142 (FIG. 22H), and the detection pulse RDR corresponding to the leading edge portion of the picture pattern Pb is obtained from the second AND circuit (FIG. 22I). Then, the detection pulse FDR corresponding to the trailing edge portion of the picture pattern Pb is obtained from the third AND circuit 146 (FIG. 22J).

In this manner, it is also possible to detect a specific picture pattern by using the difference signal components of adjacent pixels. In this case, it is possible to reduce the number of circuit elements than those shown in FIG. 14.

Figure 23:
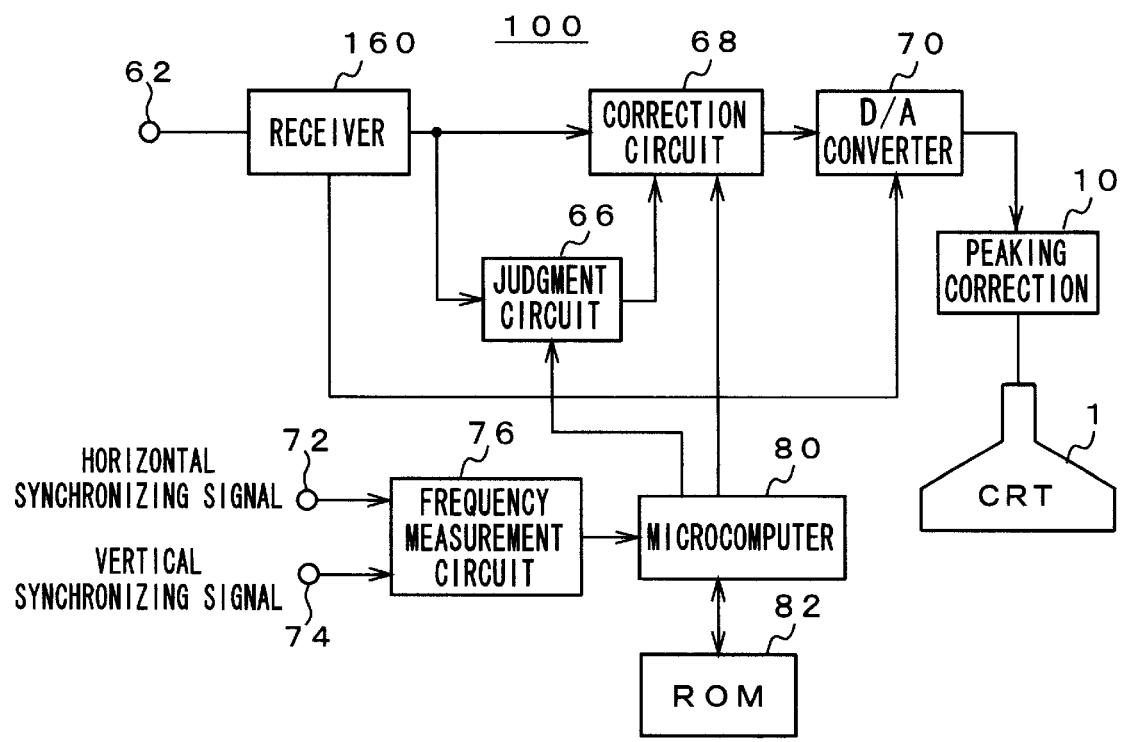
FIG. 23 is a system diagram of the essential parts showing another embodiment of the image processing apparatus in accordance with this invention.

FIG. 23 shows another embodiment of the image processing apparatus 100.

This image processing apparatus 100 is of a digital type, so that a receiver 160 for digital interface becomes necessary in place of the A/D converter 64 of FIG. 10. The clock input from an input terminal can be used as a clock for the receiver 160 and the D/A converter 70, and hence the PLL circuit 78 of FIG. 10 becomes unnecessary. The other configuration is the same as in FIG. 10, and hence the description thereon is omitted.

Any of the values of the horizontal and vertical frequencies, the values of the correction coefficients PC, RC, and FC shown in FIG. 11, the value of the number of pixels n involved in the correction processing, and the like is one example. For example, when peak and edge patterns are detected by using 2n+1=5 pixels wherein n=2 where n is the number of pixels, it is possible to respectively detect the peak pattern made up of a pixel whose number is 1, the peak pattern made up of pixels whose number is 2, and both edges of the peak pattern made up of pixels whose number is not less than 3. Therefore, the suitable correction according to each of the patterns becomes possible. It is also possible to set different correction coefficients for respective patterns, which can be implemented by preparing a large number of correction values in that case.

Further, the foregoing correction values and the like are to be appropriately selected according to the characteristics of the monitor to be used and the characteristics of the signal transmission system.

INDUSTRIAL APPLICABILITY

An image processing apparatus in accordance with this invention is available for a picture display apparatus such as a computer display required to have high fidelity and high resolution.

What is claimed is:

1. An image processing apparatus comprising:

pixel judgment means; and pixel correction means, each said pixel judgment means and said pixel correction means receiving digital input picture signals of R, G, and B, wherein said pixel judgment means includes target pixel detection means for detecting a target pixel having a peak level in said input picture signal and edge detection means for detecting an edge from a total of 2n+1 pixels of the target pixel and n pixels preceding and succeeding the target pixel;

wherein said pixel correction means includes correction coefficient selection means for selecting a peak level correction coefficient according to an output from said target pixel detection means and for selecting an edge correction coefficient according to an output from said edge detection means; and wherein a level of the target pixel is corrected and an edge of said input picture signal is corrected with a pixel of said input picture signal being corrected according to said peak level correction coefficient and said edge correction coefficient, respectively.

2. The image processing apparatus according to claim 1, wherein said pixel judgment means comprises a plurality of monochrome judgment circuits and OR circuits.

3. The image processing apparatus according to claim 2, wherein each said plurality of monochrome judgment circuits comprises: a pair of delay means; a level judgment unit for judging levels of the target pixel and the pixels preceding and succeeding the target pixel; and an edge judgment unit for judging leading and trailing edges of said target pixel when n=1.

4. The image processing apparatus according to claim 3, wherein each of said level judgment unit and edge judgment unit includes a level comparator.

5. The image processing apparatus according to claim 1, wherein according to a detection result from the pixel judgment means, the correction coefficient to be added to the detection result is switched.

6. The image processing apparatus according to claim 1, wherein R, G, and B of the target pixel are respectively multiplied by the same correction coefficient to prevent a color balance from being degraded upon correction of the peak level and the edge of said target pixel.

* * * * *